(12) United States Patent
Brodsky et al.

(10) Patent No.: US 12,346,352 B2
(45) Date of Patent: Jul. 1, 2025

(54) GEOSPATIAL DATA ANALYTICS AND VISUALIZATION PLATFORM

(71) Applicant: FOURSQUARE LABS, INC., New York, NY (US)

(72) Inventors: Isaac Mehro Brodsky, Burlingame, CA (US); Shan He, San Francisco, CA (US); Ib Green, San Carlos, CA (US); Sina Rassaei Kashuk, San Francisco, CA (US)

(73) Assignee: FOURSQUARE LABS, INC., New York, NY (US)

( * ) Notice: Subject to any disclaimer, the term of this patent is extended or adjusted under 35 U.S.C. 154(b) by 0 days.

(21) Appl. No.: 17/527,845

(22) Filed: Nov. 16, 2021

(65) Prior Publication Data

US 2022/0156291 A1    May 19, 2022

Related U.S. Application Data

(60) Provisional application No. 63/114,381, filed on Nov. 16, 2020.

(51) Int. Cl.
  *G06F 16/29* (2019.01)
  *G06F 16/248* (2019.01)
  *G06F 16/28* (2019.01)

(52) U.S. Cl.
  CPC ............ *G06F 16/29* (2019.01); *G06F 16/248* (2019.01); *G06F 16/285* (2019.01)

(58) Field of Classification Search
  CPC ...... G06F 16/29; G06F 16/248; G06F 16/285; G06F 16/9537; G06F 16/444
  USPC .......................................................... 707/722
  See application file for complete search history.

(56) References Cited

U.S. PATENT DOCUMENTS

| | | | |
|---|---|---|---|
| 10,444,941 B2 * | 10/2019 | Cervelli | G06T 11/60 |
| 11,380,441 B1 * | 7/2022 | Baker | H04L 67/52 |
| 2008/0307498 A1 * | 12/2008 | Johnson | G06F 21/6218 726/3 |
| 2010/0104174 A1 * | 4/2010 | Rohlf | G06F 16/29 382/154 |
| 2012/0038662 A1 * | 2/2012 | Dicklin | G09G 5/377 345/635 |
| 2014/0280064 A1 * | 9/2014 | McDougall | G06N 5/04 707/769 |
| 2016/0300375 A1 | 10/2016 | Beckett | |
| 2017/0293635 A1 * | 10/2017 | Peterson | G06F 16/2477 |

(Continued)

OTHER PUBLICATIONS

Communication Pursuant to Article 94(3) issued in EP Appl. No. 21827259.9 on Mar. 14, 2025 (8 pages).

(Continued)

*Primary Examiner* — Hung T Vy
(74) *Attorney, Agent, or Firm* — Faegre Drinker Biddle & Reath LLP

(57) ABSTRACT

The disclosure relates to a system and method for facilitating geospatial processing and analysis of datasets and providing a visualization of geospatial analytics data over a network. The platform utilizes a discrete global grid system to partition an area (e.g., a map, a city, a state, a country, a continent, the world, etc.) into a set of discrete grid cells. The set of grid cells can be subdivided into finer resolutions of grids. In examples, the platform generates and employs the use of hex tiles for the grid cells.

20 Claims, 7 Drawing Sheets

(56) References Cited

U.S. PATENT DOCUMENTS

2018/0040011 A1\* 2/2018 Milton ................. H04W 4/029
2019/0128679 A1 5/2019 Thompson

OTHER PUBLICATIONS

Brodsky Isaac: "H3: Uber's Hexagonal Hierarchical Spatial Index", Jun. 27, 2018 (Jun. 27, 2018), XP55896586, Retrieved from the Internet: URL:https://eng.uber.com/h3/.

Brodsky Isaac: "Import the library . uber/h3@1dcd63b . Github", Jan. 8, 2018 (Jan. 8, 2018), XP055896519, Retrieved from the Internet: URL:https://github.com/uber/h3/commit/1dcd63bcce28c850d5e6e2f3b095cb06ee6420fc.

Itoh Takayuki et al: "Enhanced Hexagon-Tiling Algorithm for Map-Like Information Visualization" Proceedings of the 8th International Symposium on Visual Information Communication and Interaction, Aug. 24, 2015 (Aug. 24, 2015), pp. 137-142, XP055896009, New York, NY, USA.

\* cited by examiner

US 12,346,352 B2

GEOSPATIAL DATA ANALYTICS AND VISUALIZATION PLATFORM

CROSS-REFERENCE TO RELATED APPLICATION

This application claims priority to U.S. Provisional Application No. 63/114,381, titled "Geospatial Data Analytics and Visualization," filed on Nov. 16, 2020, the entire disclosure of which is hereby incorporated by reference in its entirety.

BACKGROUND

Performing geospatial analytics over a network presents a number of problems, such as the difficulty of transmitting a large amount of data required to perform the analytics over a network. Additionally, traditional geospatial analytics systems are generally implemented using a raster tile system or a vector tile system. Each of these systems have certain drawbacks. For example, raster tile systems present difficulties when being used to perform analytics on a frontend device. Further, it can be computationally expensive to encode data in a vector tile system.

It is with respect to these and other general considerations that embodiments have been described. Also, although relatively specific problems have been discussed, it should be understood that the embodiments should not be limited to solving the specific problems identified in the background.

SUMMARY

The techniques introduced herein overcome the deficiencies and limitations of the prior art, at least in part, with a system and method for facilitating geo spatial processing of datasets and providing a visualization of geospatial analytics data over a network. In particular, the system includes a proprietary implementation and specification for a hex tile format. Hex tiles are a system for transferring geo spatial analytics data over a network (e.g., Internet). A format of the hex tiles enables high performance data transfer with a geospatial grid system and allow unification of different datasets using the same tile system. Hex tiles have similarities with traditional raster tile systems and vector tile systems. Unlike raster tile systems, hex tile systems can be used for analytics on the frontend. Unlike vector tile systems, hex tile systems can encode data more efficiently for the representation of analytical datasets. Hex tile systems uniquely provide an analytical tile system that allows data to be analyzed, explored, visualized, and unified with other datasets.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

The techniques introduced herein are illustrated by way of example, and not by way of limitation in the figures of the accompanying drawings in which like reference numerals are used to refer to similar elements.

DETAILED DESCRIPTION

Figure 1:
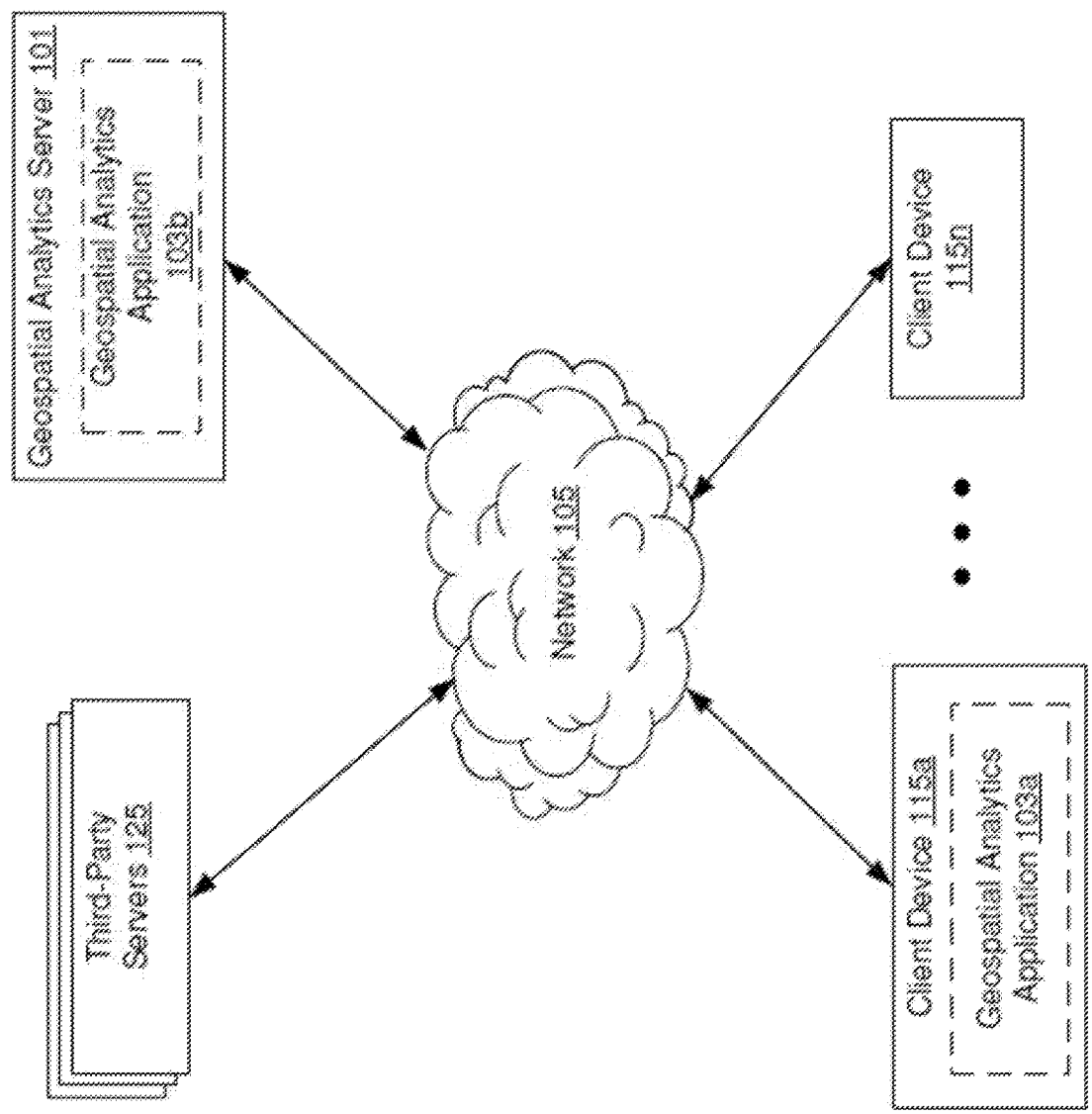
FIG. 1 is a high-level block diagram illustrating one embodiment of a system for providing a platform for performing geospatial analysis, unification, and visualization of datasets.

Aspects of the present disclosure generally relates to providing a platform for performing geospatial analysis, unification, and visualization of datasets. The disclosure relates to a system and method for facilitating geospatial processing and analysis of datasets and providing a visualization of geospatial analytics data over a network. The platform utilizes a discrete global grid system to partition an area (e.g., a map, a city, a state, a country, a continent, the world, etc.) into a set of discrete grid cells. The set of grid cells can be subdivided into finer resolutions of grids. In examples, the platform generates and employs the use of hex tiles for the grid cells. Use of hex tiles provides, among other benefits, a computationally efficient and consistent hierarchical grid that offers analytical advantages of hexagonal cells, such as, for example, constant distance to neighboring cells, the ability to form concentric rings of cells, compact cell representation, and computationally trivial aggregation of data in the hex tiles.

A hexagonal grid based geospatial indexing system is a major technical advancement in geospatial grid systems. It is a computationally efficient and consistent hierarchical grid that offers the analytical advantages of hexagonal cells. While the analytical advantages of hexagonal cells are evident, there is, however, a persistent need to address significant technical problems and create a globally consistent and efficient hexagonal grid for use in geospatial data analytics.

Aspects of the present disclosure allow for the calculation and performance of global analytics using hex tile data. In examples, global analytics apply a calculation, or a set of calculations, to data over large areas of a location (e.g., a country, the world, etc.) at a high level of detail. For large datasets, performing such analytics typically involves processing more data that can fit into memory, even on very large servers. By utilizing hex tiles, the data can be loaded in parts as need to proceed with the calculations and then unloaded as new areas are being processed. Furthermore, if multiple datasets are encoded as hex tiles, the corresponding parts from the different datasets can easily be identified and loaded for analytics.

The use of hex tiles also can be performed on-the-fly, that is, a device performing the analytics can apply the analytics to a specific hex tile or set of hex tiles before serving the hex tiles. In doing so, only the parts of the dataset represented by relevant hex tiles are computed in response to a client request. This can be done before each client request, thereby giving the sense that one or more large, global datasets was computed based upon the requested analytics, when in fact a small subset of the datasets was computed responsive to a client request. In doing so, the aspects disclosed herein can quickly perform calculations on datasets responsive to client requests, thereby reducing load time and bandwidth requirements for individual client devices.

In still further aspects, the use of hex tiles support the processing of local analytics. Local analytics are processed on a client device, for example, using a web browser or other application. The use of hex tiles allows for analytics to be performed locally on a client device even when the underlying data set is too large to transfer to the client system. Furthermore, in doing so, the use of hex tiles allows for delivery of relevant data on demand, which makes the computation of local analytics by a client device appear to be a global analytic calculation to the user of the client device. For example, when the user adjusts a map view, a request for additional hex tiles needed to display the new area is automatically generated. Analytical calculations are automatically performed on the additional hex tiles, thereby maintaining a constant level of data granularity as the client device changes views. In doing so, aspects disclosed herein can easily transmit relevant data to client devices in real-time, thereby giving the appearance that a global data set has been transferred to the client device without necessitating the transfer of the entire dataset. While examples of the present disclosure relate to using hex tiles in a grid system, one of skill in the art will appreciate that other types of tiles may be employed with aspects disclosed herein without departing from the scope of this disclosure. For example, square, rectangular, or other geometrically shaped tiles may be used without departing from the scope of this disclosure.

FIG. 1 is a high-level block diagram illustrating one embodiment of a system 100 for providing a platform for performing geospatial analysis, unification, and visualization of datasets. The illustrated system 100 may have one or more client devices 115a . . . 115n that can be accessed by users, a geospatial analytics server 101, and a plurality of third-party servers 125. In FIG. 1 and the remaining figures, a letter after a reference number, e.g., "115a," represents a reference to the element having that particular reference number. A reference number in the text without a following letter, e.g., "115," represents a general reference to instances of the element bearing that reference number. In the illustrated embodiment, these entities of the system 100 are communicatively coupled via a network 105.

The network 105 may be a conventional type, wired or wireless, and may have numerous different configurations including a star configuration, token ring configuration, or other configurations. Furthermore, the network 105 may include any number of networks and/or network types. For example, the network 105 may include a local area network (LAN), a wide area network (WAN) (e.g., the Internet), virtual private networks (VPNs), mobile (cellular) networks, wireless wide area network (WWANs), WiMAX® networks, Bluetooth® communication networks, peer-to-peer networks, and/or other interconnected data paths across which multiple devices may communicate, various combinations thereof, etc. The network 105 may also be coupled to or include portions of a telecommunications network for sending data in a variety of different communication protocols. In some implementations, the network 105 may include Bluetooth communication networks or a cellular communications network for sending and receiving data including via short messaging service (SMS), multimedia messaging service (MMS), hypertext transfer protocol (HTTP), direct data connection, WAP, email, etc. In some implementations, the data transmitted by the network 105 may include packetized data (e.g., Internet Protocol (IP) data packets) that is routed to designated computing devices coupled to the network 105. Although FIG. 1 illustrates one network 105 coupled to the client devices 115, the geospatial analytics server 101, and the plurality of third-party servers 125, in practice one or more networks 105 can be connected to these entities.

The client devices 115a . . . 115n (also referred to individually as client device 115) may be computing devices having data processing and communication capabilities. In some implementations, a client device 115 may include a memory, a processor (e.g., virtual, physical, etc.), a power source, a network interface, software and/or hardware components, such as a display, graphics processing unit (GPU), wireless transceivers, keyboard, camera (e.g., webcam), sensors, firmware, operating systems, web browsers, applications, drivers, and various physical connection interfaces (e.g., USB, HDMI, etc.). The client devices 115a . . . 115n may couple to and communicate with one another and the other entities of the system 100 via the network 105 using a wireless and/or wired connection. Examples of client devices 115 may include, but are not limited to, laptops, desktops, tablets, mobile phones (e.g., smartphones, feature phones, etc.), server appliances, servers, virtual machines, smart TVs, media streaming devices, user wearable computing devices or any other electronic device capable of accessing a network 105. In the example of FIG. 1, the client device 115a is configured to implement a geospatial analytics application 103a described in more detail below. The client device 115 includes a display for viewing information provided by one or more entities coupled to the network 105. For example, the client device 115 may be adapted to send and receive data to and from the geospatial analytics server 101. While two or more client devices 115 are depicted in FIG. 1, the system 100 may include any number of client devices 115. In addition, the client devices 115a . . . 115n may be the same or different types of computing devices.

In the example of FIG. 1, each one of the geospatial analytics servers 101 and the plurality of third-party servers 125 may be, or may be implemented by, a computing device including a processor, a memory, applications, a database, and network communication capabilities.

In the example of FIG. 1, the components of the geospatial analytics server 101 are configured to implement a geospatial analytics application 103b described in more detail below. In some implementations, the geospatial analytics server 101 may provide a platform for performing geospatial analysis, unification, and visualization of datasets via web, mobile, and/or cloud applications.

In some implementations, the geospatial analytics server 101 may be a hardware server, a software server, or a combination of software and hardware. For example, the geospatial analytics server 101 may include one or more hardware servers, virtual servers, server arrays, storage devices and/or systems, etc., and/or may be centralized or distributed/cloud-based. In some implementations, the geospatial analytics server 101 may include one or more virtual servers, which operate in a host server environment and access the physical hardware of the host server including, for example, a processor, a memory, applications, a database, storage, network interfaces, etc., via an abstraction layer (e.g., a virtual machine manager). In some implementations, the geospatial analytics server 101 may be a Hypertext Transfer Protocol (HTTP) server, a Representational State Transfer (REST) service, or other server type, having structure and/or functionality for processing and satisfying content requests and/or receiving content from one or more of the client devices 115 and the plurality of the third-party servers 125 that are coupled to the network 105.

Also, instead of or in addition, the geospatial analytics server 101 may implement its own application programing interface (API) for the transmission of instructions, data, results, and other information between the geospatial analytics server 101 and an application installed or otherwise implemented on one or more of the client devices 115 and the plurality of third-party server 125. For example, the API may be a software interface exposed over the HTTP protocol by the geospatial analytics server 101. The API exposes internal data and functionality of the service hosted by the geospatial analytics server 101 to API requests originating from the geospatial analytics application 103a, for example. The geospatial analytics server 101 may also include a database coupled to the geospatial analytics server 101 over the network 105 to store structured data in a relational database and a file system (e.g., HDFS, NFS, etc.) for unstructured or semi-structured data.

In some implementations, the geospatial analytics server 101 sends and receives data to and from other entities of the system 100 via the network 105. For example, the geospatial analytics server 101 sends and receives data including instructions to and from the client device 115. In some implementations, the geospatial analytics server 101 may be operable to enable the users of the client devices 115a . . . 115n to create and manage individual user accounts; receive, store, and/or manage transfer of hex tile data in a geospatial analytics and visualization task from the geospatial analytics server 101 to the client device 115 over the network 105. The geospatial analytics server 101 may send data to and receive data from the other entities of the system 100 including the client devices 115 and the plurality of the third-party servers 125 via the network 105. It should be understood that the geospatial analytics server 101 is not limited to providing the above-noted acts and/or functionality and may include other network-accessible services. In addition, while a single geospatial analytics server 101 is depicted in FIG. 1, it should be understood that there may be any number of geospatial analytics servers 101 or a server cluster.

In the example of FIG. 1, the system 100 includes a plurality of third-party servers 125. The plurality of third-party servers 125 may communicate with one or more entities of the system 100, such as the plurality of the client device 115 and the geospatial analytics server 101. For example, the third-party server 125 may include a social media server, a web mapping server, a satellite imagery server, a telecommunication server, a spatial database server, a remote sensing server, a healthcare server, a public sector server, an insurance server, a weather server, etc. In some implementations, each of the plurality of third-party servers 125 may be configured to provide or facilitate an application programming interface (API) that allows trusted third-party applications or systems to access geospatial or geospatial related information for performing the functionality described herein.

The geospatial analytics application 103 may include software and/or logic to provide the functionality for performing geospatial analysis, unification, and visualization of datasets. In some implementations, the geospatial analytics application 103 may be implemented using programmable or specialized hardware, such as a field-programmable gate array (FPGA) or an application-specific integrated circuit (ASIC). In some implementations, the geospatial analytics application 103 may be implemented using a combination of hardware and software. In other implementations, the geospatial analytics application 103 may be stored and executed on a combination of the client devices 115 and the geospatial analytics server 101, or by any one of the client devices 115 or the geospatial analytics server 101.

In some implementations, the geospatial analytics application 103a may be a thin-client application with some functionality executed on the client device 115 and additional functionality executed on the geospatial analytics server 101 by the geospatial analytics application 103b. In some implementations, the geospatial analytics application 103 may generate and present various user interfaces to perform these acts and/or functionality, which may in some cases be based at least in part on information received from the geospatial analytics server 101, the client device 115, and/or the plurality of third-party servers 125 via the network 105. In some implementations, the geospatial analytics application 110 is code operable in a web browser, a web application accessible via a web browser, a native application (e.g., mobile application, installed application, etc.) on the client device 115, a combination thereof, etc. Additional structure, acts, and/or functionality of the geospatial analytics applications 103a and 103b are further discussed below with reference to at least FIG. 2.

In some implementations, the geospatial analytics applications 103a and 103b may require users to be registered with the geospatial analytics server 101 to access the acts and/or functionality described herein. For example, to access various acts and/or functionality provided by the geospatial analytics application 103, the geospatial analytics application 103 may require a user to authenticate his/her identity. For example, the geospatial analytics application 103 may require a user seeking access to authenticate their identity by inputting credentials in an associated user interface. In another example, the geospatial analytics application 103 may interact with a federated identity server (not shown) to register and/or authenticate the user.

It should be understood that the system 100 illustrated in FIG. 1 is representative of an example system for providing a platform for performing geospatial analysis, unification, and visualization of datasets, and that a variety of different system environments and configurations are contemplated and are within the scope of the present disclosure. For instance, various functionality may be moved from the geospatial analytics server 101 to a client device 115, or vice versa and some implementations may include additional or fewer computing devices, services, and/or networks, and may implement various functionality client or server-side. Further, various entities of the system 100 may be integrated into to a single computing device or system or additional computing devices or systems, etc.

Figure 2:
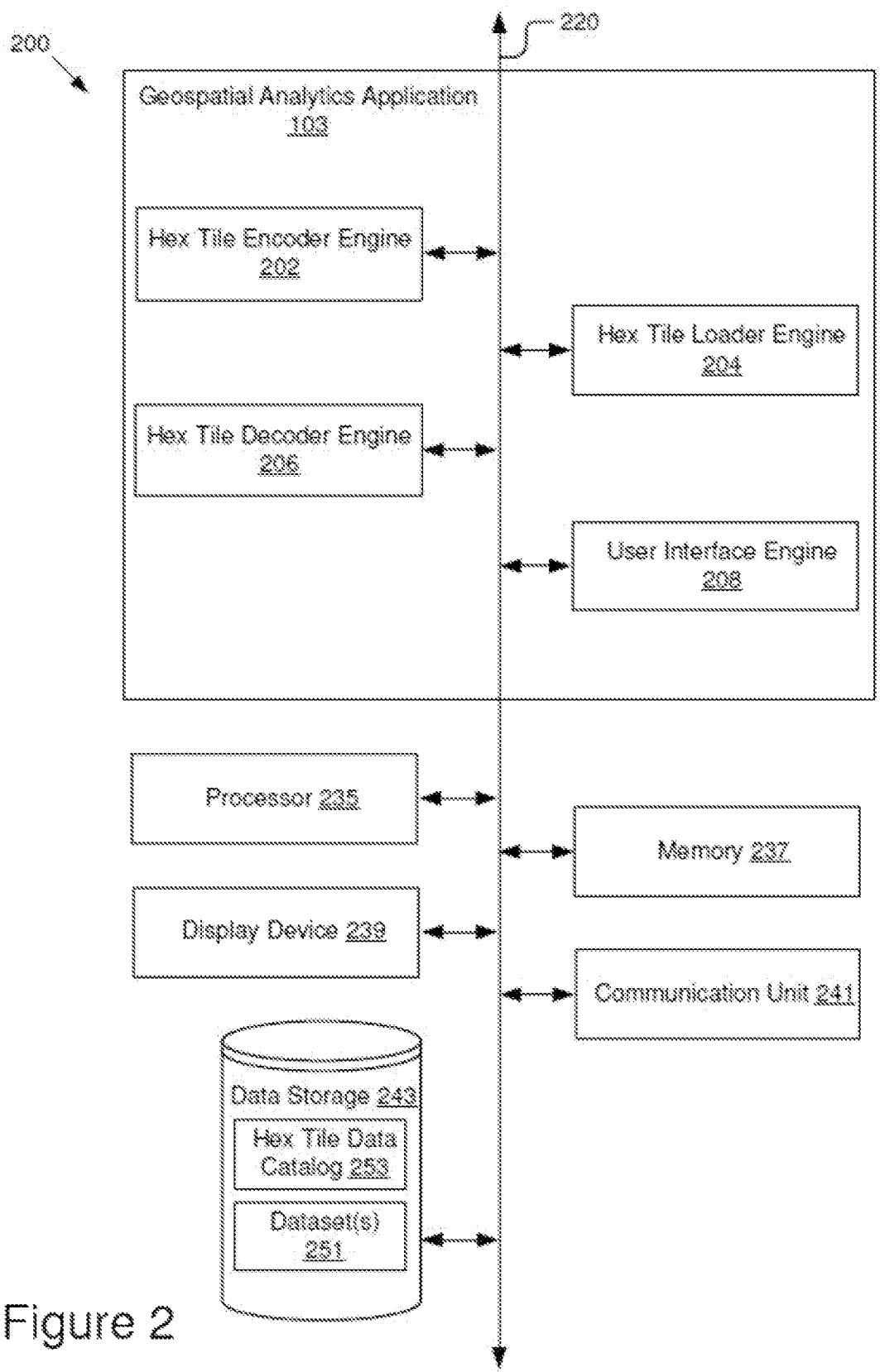
FIG. 2 is a block diagram illustrating one embodiment of a computing device including a geospatial analytics application.

FIG. 2 is a block diagram illustrating one embodiment of a computing device 200 including a geospatial analytics application 103. The computing device 200 may also include a processor 235, a memory 237, a display device 239, a communication unit 241, and a data storage 243, according to some examples. The components of the computing device 200 are communicatively coupled by a bus 220. The bus 220 may represent one or more buses including an industry standard architecture (ISA) bus, a peripheral component interconnect (PCI) bus, a universal serial bus (USB), or some other bus known in the art to provide similar functionality. In some embodiments, the computing device 200 may be the client device 115, the geospatial analytics server 101, or a combination of the client device 115 and the geospatial analytics server 101. In such embodiments where the computing device 200 is the client device 115 or the geospatial analytics server 101, it should be understood that the client device 115, and the geospatial analytics server 101 may include other components described above but not shown in FIG. 2.

The processor 235 may execute software instructions by performing various input/output, logical, and/or mathematical operations. The processor 235 may have various computing architectures to process data signals including, for example, a complex instruction set computer (CISC) architecture, a reduced instruction set computer (RISC) architecture, and/or an architecture implementing a combination of instruction sets. The processor 235 may be physical and/or virtual, and may include a single processing unit or a plurality of processing units and/or cores. In some implementations, the processor 235 may be capable of generating and providing electronic display signals to a display device, supporting the display of images, capturing and transmitting images, and performing complex tasks. In some implementations, the processor 235 may be coupled to the memory 237 via the bus 220 to access data and instructions therefrom and store data therein. The bus 220 may couple the processor 235 to the other components of the computing device 200 including, for example, the memory 237, the communication unit 241, the geospatial analytics application 103, and the data storage 243. It will be apparent to one skilled in the art that other processors, multiple processors, operating systems, sensors, displays, and physical configurations are possible.

The memory 237 may store and provide access to data for the other components of the computing device 200. The memory 237 may be included in a single computing device or distributed among a plurality of computing devices as discussed elsewhere herein. In some implementations, the memory 237 may store instructions and/or data that may be executed by the processor 235. The instructions and/or data may include code for performing the techniques described herein. For example, in one embodiment, the memory 237 may store the geospatial analytics application 103. The memory 237 is also capable of storing other instructions and data, including, for example, an operating system, hardware drivers, other software applications, databases, etc. The memory 237 may be coupled to the bus 220 for communication with the processor 235 and the other components of the computing device 200.

The memory 237 may include one or more non-transitory computer-usable (e.g., readable, writeable) device, a static random access memory (SRAM) device, a dynamic random access memory (DRAM) device, an embedded memory device, a discrete memory device (e.g., a PROM, FPROM, ROM), a hard disk drive, an optical disk drive (CD, DVD, Blu-ray™, etc.) mediums, which can be any tangible apparatus or device that can contain, store, communicate, or transport instructions, data, computer programs, software, code, routines, etc., for processing by or in connection with the processor 235. In some implementations, the memory 237 may include one or more of volatile memory and non-volatile memory. It should be understood that the memory 237 may be a single device or may include multiple types of devices and configurations.

The display device 239 is a liquid crystal display (LCD), light emitting diode (LED) or any other similarly equipped display device, screen or monitor. The display device 239 represents any device equipped to display user interfaces, electronic images, and data as described herein. In different embodiments, the display is binary (only two different values for pixels), monochrome (multiple shades of one color), or allows multiple colors and shades. The display device 239 is coupled to the bus 220 for communication with the processor 235 and the other components of the computing device 200. It should be noted that the display device 239 can be optional. For example, where the computing device 200 is the geospatial analytics server 101, the display device 239 is not part of the system.

The communication unit 241 is hardware for receiving and transmitting data by linking the processor 235 to the network 105 and other processing systems. The communication unit 241 receives data such as user input from the client device 115 and transmits the data to the user interface engine 208. The communication unit 241 also transmits instructions from the user interface engine 208 for displaying the user interface on the client device 115, for example. The communication unit 241 is coupled to the bus 220. In one embodiment, the communication unit 241 may include a port for direct physical connection to the client device 115 or to another communication channel. For example, the communication unit 241 may include an RJ45 port or similar port for wired communication with the client device 115. In another embodiment, the communication unit 241 may include a wireless transceiver (not shown) for exchanging data with the client device 115 or any other communication channel using one or more wireless communication methods, such as IEEE 802.11, IEEE 802.16, Bluetooth® or another suitable wireless communication method.

In yet another embodiment, the communication unit 241 may include a cellular communications transceiver for sending and receiving data over a cellular communications network such as via short messaging service (SMS), multimedia messaging service (MMS), hypertext transfer protocol (HTTP), direct data connection, WAP, e-mail or another suitable type of electronic communication. In still another embodiment, the communication unit 241 may include a wired port and a wireless transceiver. The communication unit 241 also provides other conventional connections to the network 105 for distribution of files and/or media objects using standard network protocols such as TCP/IP, HTTP, HTTPS, and SMTP as will be understood to those skilled in the art.

The data storage 243 is a non-transitory memory that stores data for providing the functionality described herein. The data storage 243 may be included in the computing device 200 or in another computing device and/or storage system distinct from but coupled to or accessible by the computing device 200. The data storage 243 may include one or more non-transitory computer-readable mediums for storing the data. In some implementations, the data storage 243 may be incorporated with the memory 237 or may be distinct therefrom. The data storage 243 may be a dynamic random-access memory (DRAM) device, a static random-access memory (SRAM) device, flash memory, or some other memory devices. In some implementations, the data storage 243 may include a database management system (DBMS) operable on the computing device 200. For example, the DBMS could include a structured query language (SQL) DBMS, a NoSQL DMBS, various combinations thereof, etc. In some instances, the DBMS may store data in multi-dimensional tables comprised of rows and columns, and manipulate, e.g., insert, query, update and/or delete, rows of data using programmatic operations. In other implementations, the data storage 243 also may include a non-volatile memory or similar permanent storage device and media including a hard disk drive, a CD-ROM device, a DVD-ROM device, a DVD-RAM device, a DVD-RW device, a flash memory device, or some other mass storage device for storing information on a more permanent basis. The data storage 243 is communicatively coupled to the bus 220. The data storage 243 stores data associated with performing geospatial analysis, unification, and visualization of datasets and other functionality as described herein. The data storage 243 may store, among other data, hex tile data catalog 253 and geospatial datasets 251. The data stored in the data storage 243 is described below in more detail.

As depicted in FIG. 2, the memory 237 may include the geospatial analytics applications 103a and/or 103b. In some implementations, the geospatial analytics applications 103a and/or 103b may include a hex tile encoder engine 202, a hex tile loader engine 204, a hex tile decoder engine 206, and a user interface engine 208. The components 202, 204, 206, and 208 may be communicatively coupled by the bus 220 and/or the processor 235 to one another and/or the other components 237, 239, 241, and 243 of the computing device 200 for cooperation and communication. The components 202, 204, 206, and 208 may include software and/or logic to provide their respective functionality. In some implementations, the components 202, 204, 206, and 208 may be implemented using programmable or specialized hardware including a field-programmable gate array (FPGA) or an application-specific integrated circuit (ASIC). In some implementations, the components 202, 204, 206, and 208 may be implemented using a combination of hardware and software executable by the processor 235. In some implementations, each one of the components 202, 204, 206, and 208 may be sets of instructions stored in the memory 237 and configured to be accessible and executable by the processor 235 to provide their acts and/or functionality. In some implementations, the components 202, 204, 206, and 208 may send and receive data, via the communication unit 241, to and from one or more of the client devices 115 and the third-party servers 125.

The hex tile encoder engine 202 may include software and/or logic to provide the functionality for receiving one or more datasets as input and generating hex tile files as output. In some implementations, the hex tile encoder engine 202 accesses arbitrarily large datasets 251 from the data storage 243 and processes them into hex tiles for facilitating efficient geospatial analytics. For example, the dataset may be larger (e.g., in the petabyte range) than that which can be transferred to the client device 115. The hex tile encoder engine 202 creates hex tiles so that parts of the dataset can be transferred to the client device 115 as needed. The hex tiles may be made available for immediate local and global analytics. The hex tile encoder engine 202 stores the hex tiles in the hex tile data catalog 253 in the data storage 243. The hex tile data catalog 253 may include information about the data source (e.g., author, license, etc.), the data itself, how the data was created, the available resolution, screenshots of maps using this data, etc.

The hex tile system described herein is a proprietary specification of the hex tile format. The specification of the hex tile format may be defined by an enclosing format, a discrete global grid system, and a compression scheme. For example, in an implementation, the proprietary specification of the hex tile format described herein uses Apache ARROW™ as the binary transfer format, H3 hexagonal hierarchical geo spatial indexing system as the discrete global grid system (DGGS), and GNU zip (gzip) as the compression scheme. Apache ARROW™ defines a language-independent columnar memory format for flat and hierarchical data, organized for efficient analytic operations on modern hardware like CPUs and GPUs. H3 hexagonal hierarchical geo spatial indexing system is suited to analytics and designed for high performance in big data systems with 64-bit cell indexes, though one of skill in the art will appreciate that other types of indexing systems may be employed. The compression scheme gzip may be used because of its ubiquitous implementation in web browsers. In other implementations, the specification of the hex tile format may use Apache PARQUET™ and non-binary formats, such as comma-separated values (CSV), JavaScript Object Notation (JSON), etc. as the enclosing format, S2 geometry library, Geohash, and PLACEKEY™ as the discrete global grid system, and Zstandard (zstd) and LZ4 as the compression scheme. While specific implementations for a hex tile format have been disclosed herein, one of skill in the art will appreciate that other implementations may be employed without departing from the scope of this disclosure.

The hex tile system described herein transfers data tile-by-tile. A tile covers a spatial cell in a discrete global grid system (DGGS) used by the hex tile system. The DGGS partitions the world into a set of discrete grid cells. The set of grid cells can be subdivided into finer and finer resolutions of grids. A tile includes data in it that is in the same DGGS at a finer resolution. A tile may also include metadata indicating the resolution of the data within it, and/or metadata indicating which sub tiles are available. This metadata avoids loading sub tiles when no data exists. For example, the metadata may include a list of seven direct sub tiles, and optionally lists finer resolution tiles (e.g., 7*7=49 tiles) two levels down.

Data in a tile may be tabular. A tile includes that data for the area within its cell. For example, the tile with the H3 cell "8428347ffffff" may include the following data points shown in Table 1:

TABLE 1

| Grid ID | Attribute 1 | Attribute 2 |
| --- | --- | --- |
| 85283463ffffff | 1 | A |
| 85283467ffffff | 2 | A |
| 8528346bffffff | 3 | A |
| 8528346fffffff | 4.5 | B |
| 85283473ffffff | 0 | B |
| 8528347bffffff | 1 | C |

In the example of Table I, the hex tile includes every data point possible within the tile except for "85283477ffffff" and is encoded in the "sparse" format. Alternatively, the hex tile may include a subset of the available data. Hex tiles may also support a "dense" encoding where the data points do not have an explicit grid identifier (grid ID) stored in the file, but instead implicitly define the grid ID by ordering (such as using the ordering defined by the grid IDs, or more generally using space filling curves). The dense encoding eliminates the need to encode grid IDs within the tile, reduces storage, memory, and transfer costs associated with the hex tile system. Dense mode is indicated on a per-tile basis, as part of the tile metadata. It is possible to reconstitute the grid IDs for a dense tile. In dense encoding, the data points shown in Table I may be encoded as shown in Table 2 below:

TABLE 2

| Attribute 1 | Attribute 2 |
| --- | --- |
| 1 | A |
| 2 | A |
| 3 | A |
| 4.5 | B |
| 0 | B |
| --NULL-- | --NULL-- |
| 1 | C |

In some implementations, the hex tiles may carry temporal data by adding time dimension (e.g., adding a new column "timestamp"). In some implementations, the hex tiles may increase the number of columns by one for each time index that the data is present for. For example, a column "attribute_1" may be expanded to "attribute_1T2020-01-01," "attribute_1T2020-01-02," "attribute_1T2020-01-03," and so on. When the client device 115 request hex tiles from the geospatial analytics server 101, the client device 115 can provide additional constraints in its request, such as requesting only the most recent month of data, second most recent month of data, and so on, in order to support arbitrarily long histories. This approach of adding dimensions may be used to support other categorical dimensions, or dimensions that can be categorized into buckets similar to time.

In some implementations, the hex tile encoder engine 202 uses an offline encoder for encoding the hex tiles ahead of time. The implementation of the offline encoder takes advantage of the bulk storage provided by systems, such as GOOGLE™ cloud storage, AMAZON™ Simple Storage Service, and other content delivery networks and outputs a set of files. The offline encoder receives the original dataset and projects it onto the DGGS at the finest resolution to be used in the hex tiles. For each resolution of hex tiles to be generated, the offline encoder is configured to (a) re-aggregate the data to the coarser resolution if the data resolution for the tiles is coarser than the finest resolution (e.g., truncating the grid IDs, grouping the data by truncated ID, and aggregating the data), (b) group the data by the grid ID, truncated to the resolution of the tile IDs (e.g., the truncated grid IDs become the tile IDs for this resolution), (c) encode each tile file with its contents as per the hex tile format specification, and (d) write additional metadata about the resolution, such as which tile IDs are valid. The offline encoder includes additional metadata about the tile set, such as which resolutions are valid, or when the client device 115 should use different resolutions of data during visualization. In some implementations, the hex tile encoder engine 202 implements the offline encoder in distributed, parallelized data processing systems, such as Apache SPARK™ or Dask. The hex tile encoder engine 202 may run the offline encoder on a schedule from a pipeline orchestration system, such as Apache AIRFLOW™ or Prefect, in order to update the data.

In some implementations, the hex tile encoder engine 202 uses an online encoder for encoding the hex tiles as they are needed. The implementation of the online encoder generates hex tiles only when they are requested by the client device 115. This enables the use of up-to-date data and support dynamic queries on the underlying data. The online encoder receives a request from the client device 115 for a certain tile ID, performs a database query for the data, and identifies the data where the truncated grid ID matches the tile ID. In some implementations, the request from the client device 115 may include additional information or criteria, such as a desired data resolution, time range, etc. The online encoder encodes the data into the tile format as per the hex tile format specification and sends a response including the requested tile corresponding to tile ID to the client device 115. In some implementations, the hex tile encoder engine 202 implements the online encoder as a REST web service with one or more of in-memory databases (e.g., Apache PINOT™, Redis, etc. for performance of serving), analytics databases (e.g., Elasticsearch, Apache DRUID™, Apache PINOT™, etc. for the combination of performance and flexibility of serving), and data warehouses (e.g., GOOGLE™ BigQuery, Snowflake, etc. for the flexibility and large datasets).

The hex tile loader engine 204 may include software and/or logic to provide the functionality for determining and requesting one or more hex tiles for decoding. The hex tile loader engine 204 tracks a map view of the visualization of the geospatial analytics data displayed on the client device 115. The hex tile loader engine 204 determines which part of the map view is currently visible to the user on the client device 115, a resolution of the hex tiles needed for the map view, and the hex tiles corresponding to the resolution that need to be requested. The hex tile loader engine 204 requests the corresponding hex tiles from the data storage 243 and passes them to the hex tile decoder engine 206 for decoding.

In some implementations, the hex tile loader engine 204 determines which resolution of hex tiles need to be requested based on a zoom level or altitude of the user's view of the map on the client device 115. The hex tile loader engine 204 requests coarser tiles when the map is more zoomed out (e.g., the user looking at the big picture difference between large areas on the map) and requests finer tiles when the map is more zoomed in (e.g., the user looking at the fine details of the dataset on the map). In some implementations, the hex tile loader engine 204 determines which tiles specifically need to be requested based on which parts of the world are or will be visible on the map view. The operations defined in the DGGS support providing all spatial cells that are visible on the map view, and additionally adding cells that are adjacent to the current view as they may come to be visible based on user's choices. Tiles at different resolutions are related to each other based on the hierarchical features of the DGGS. This forms the basis for caching tiles and their derived analytics on the client device 115 and the technique for replacing coarser tile only once its finer tiles are completely loaded, or once partial data becomes available. In some implementations, the hex tile loader engine 204 receives a uniform resource locator (URL) to a tiled dataset in a remote third-party server 125. For example, the user may specify a URL reference to the tiled dataset. The hex tile loader engine 204 accesses and/or requests the tiled dataset from the URL.

In some implementations, the hex tile loader engine 204 facilitates local analytics to be performed on the client device 115 (e.g., in the web browser) even when the underlying tiled dataset is too large to transfer to the client device 115. Hex tile system makes local analytics transparently seem like global analytics by making it seem as if the entire dataset is loaded when only a small portion of it might be loaded. When the user moves around in the map view, the hex tile loader engine 204 automatically requests additional tiles that are needed to display the new area on the client device 115 and facilitates a performance of the data operations that the user has specified while maintaining a constant level of data granularity. For example, the data operations or calculations are applied instantly to the data currently visible to the user on the client device 115. User changes to parameters may update the visualizations of the underlying datasets instantly at "60 frames per second" using GPU technology to create an extremely fluid analytics experience.

In some implementations, the hex tile loader engine 204 facilitates global analytics by applying a set of calculations to data over large areas or the entire world in the map view at a high level of detail. The hex tile loader engine 204 loads data in parts as needed to proceed with calculations and then unloads the data as new areas are being processed. If multiple datasets are hex tiles, the hex tile loader engine 204 loads the corresponding parts from multiple tile sets. In some implementations, the hex tile loader engine 204 facilitates global analytics on-the-fly where the analytics are applied per tile before serving it. This means that only those parts actually needed by a client device 115 need to be computed making it appear as if the global dataset was processed, when in fact only the small subset that was actually used by the client device 115 was processed. Hex tiles using H3 hexagonal hierarchical geospatial indexing system as the discrete global grid system have seven child tiles. As such, the length scale of each tile is square root of seven=2.65. The zoom increment at which the hex tile loader engine 204 loads new tiles to keep resolution constant is log base 2 of 2.65=1.41. Hex tiles have fewer levels and there are less breaks when zooming in and out leading to better network loads.

The hex tile decoder engine 206 may include software and/or logic to provide the functionality for receiving one or more tile files as input and generating data as output. In some implementations, the hex tile decoder engine 206 receives a tile and reverses the steps taken to encode the data into the hex tile format. For example, this decoding operation includes adding grid IDs to dense tiles, and translating between incompatible data formats. Depending on the needs of the application receiving the output data, the hex tile decoder engine 206 generates data that could be in the same grid system as used in the tiles or in another geographic form entirely. For example, a visualization application on the client device 115 might need to render the tiled data as points rather than using the grid cell boundaries. The visualization application might also choose to render the tiles as polygonal regions or in another shape altogether.

The user interface engine 208 may include software and/or logic for providing user interfaces to a user. In some embodiments, the user interface engine 208 receives instructions from the components 202, 204, and 206 to generate a user interface. In some implementations, the user interface engine 208 sends graphical user interface data to an application (e.g., a browser) in the client device 115 via the communication unit 241 causing the application to display the data as a graphical user interface.

Figure 3:
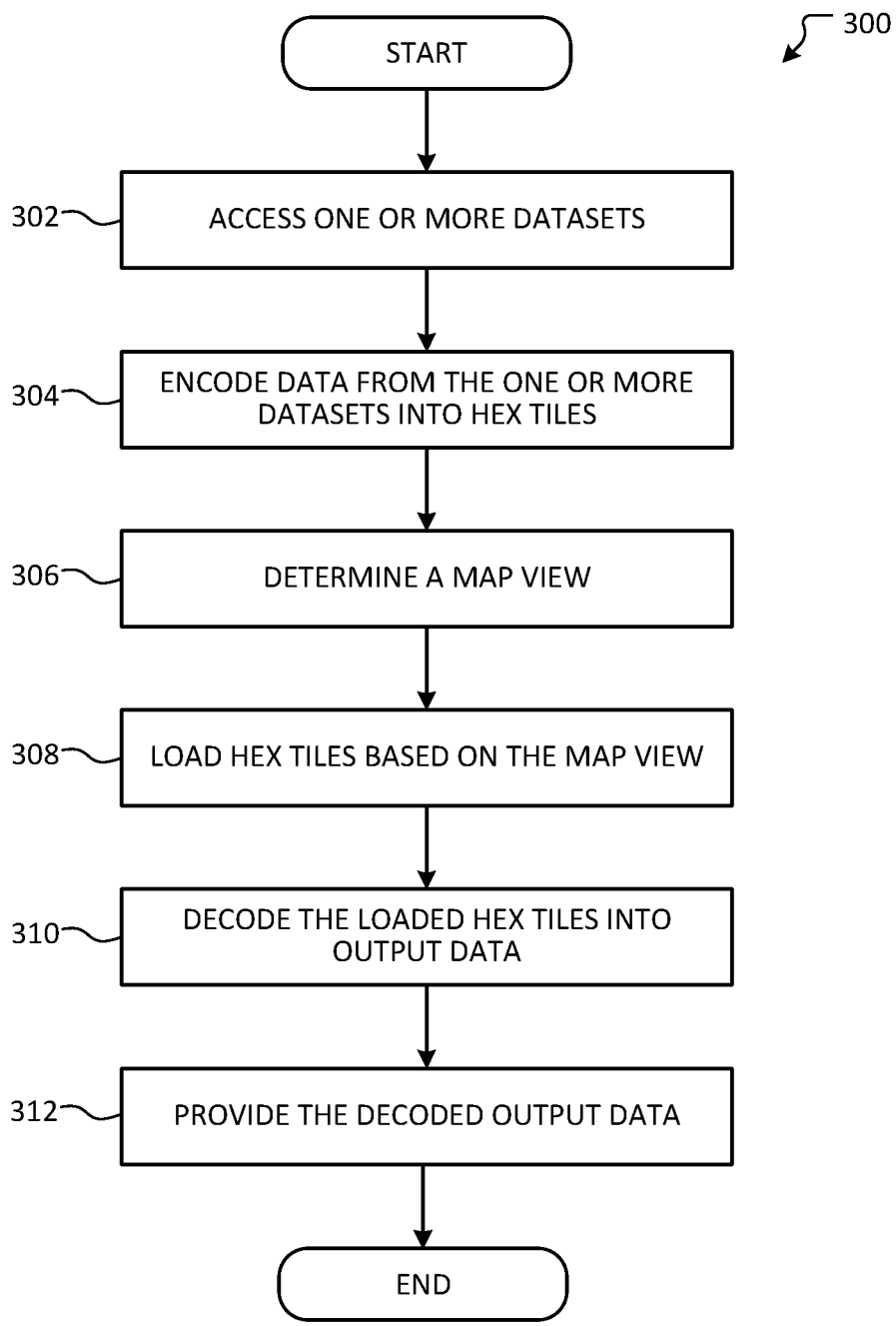
FIG. 3 is a flow diagram illustrating one embodiment of an example method for performing geospatial analysis on a dataset.

FIG. 3 is a flow diagram illustrating one embodiment of an example method 300 for performing geospatial analysis on a dataset. For example, FIG. 3 depicts an exemplary method for performing offline encoding of hex tiles. A general order of the operations for the method 300 is shown in FIG. 3. The method 300 may include more or fewer steps or may arrange the order of the steps differently than those shown in FIG. 3. The method 300 can be executed as a set of computer-executable instructions executed by a cloud system and encoded or stored on a computer readable medium. Further, the method 300 can be performed by gates or circuits associated with a processor, an ASIC, an FPGA, a SOC or other hardware device.

At operation 302, a device, process, and/or application performing the method 300, such as the hex tile encoder engine 202 of FIG. 2, accesses one or more datasets. In examples, a determination may be made as to which of the one or more datasets are accessed. For example, if a specific type of analytics is to be performed, one or more datasets relevant to the analytical calculations may be accessed at operation 302. Alternatively, or additionally, the one or more datasets may be identified specifically in a request, for example, by a client device requesting specific data and/or analytics, a selection of one or more datasets via a user interface, or the like.

At operation 304, the device, process, and/or application performing the method 300, such as the hex tile encoder engine 202 of FIG. 2, encodes data from the one or more datasets into hex tiles. The process for encoding data from the datasets into hex tiles is described FIG. 4 and the accompanying text. At 306, a determination is made as to the map view of the dataset. In one example, the determination is made based upon the current view of the map. In examples, the determination of the view is based upon the zoom level of the map view and/or the current resolution of the map being displayed or requested to be displayed. Additionally, or alternatively, determining the view may also determine which datasets should be loaded. For example, aspects of the present disclosure are operable to convert any number of different datasets to hex tiles. The different datasets may include different types of information such as, for example, population census data, weather data (i.e., rainfall, temperatures, snowfall, etc.), venue data, and the like. One of skill in the art will appreciate that any type of data, so long as the data includes a spatial component (e.g., location information) can be encoded into a hex tile. As any number of different datasets may be used, determining the view at operation 306 may also include determining which datasets should be depicted. The determination may be based upon receipt of a selection of one or more datasets. Alternatively, or additionally, the datasets may be determined based upon a specific analytics or computation to be performed, in which case hex tiles associated with the datasets related to the analytics or computations are automatically identified. In examples, operation 306 may be performed by the hex tile loader engine 204 of FIG. 2.

At 308, hex tiles are loaded based on the map view. Loading the hex tiles may include identifying hex tiles that correspond to both the resolution of the map view and the one or more datasets corresponding to the view, as discussed above. As such, multiple different hex tiles may be loaded for multiple different datasets at operation 103. In one example, the different hex tiles (e.g., hex tiles encoding data from different datasets) may be layered. Alternatively, the different hex tiles may be combined into a single hex tile which encodes data from the relevant datasets. As previously discussed, only hex tiles associated with the view (e.g., the current zoom level/resolution of the map view and/or associated data sets). That is, hex tiles associated with currently depicted, or requested for depiction, location on the map and which match the requested resolution, are loaded at operation 308.

As discussed, aspects of the present disclosure allow for the efficient loading of large datasets by determining the relevant portions of datasets and loading only the portions needed based upon the current view. That is, based upon the determinations made at operation 306, the method 300 determines which part of the map is visible and determines which resolution of hex tiles are required based upon the map view. The resolution of tiles is determined based upon the zoom level, or altitude, of the current map view. As such, coarser tiles are loaded when the view is zoomed out (e.g., providing a big picture view of differences between areas) and finer tiles are loaded with the view is zoomed in (e.g., providing finer details of the dataset encoded by the hex tiles). In doing so, relevant portions of the one or more datasets can be quickly identified and loaded. Furthermore, as the view changes (e.g., the map view zooms in or out, changes location, etc.) the determinations made at operation 306 can be repeated and the new set of hex tiles loaded, thereby providing an efficient load process which emulates the feel as if the global dataset has been transferred to the client device without actually transferring the global dataset to the device.

Additional efficiencies may be gained by caching certain hex tiles even though they are not currently required by the view. For example, hex tiles adjacent to the current view may be loaded as well at operation 308 as it is common for users to slightly adjust the map view positions. Additionally, the hex tiles of different resolutions are related to each other hierarchically. The hierarchical nature of the hex tiles provides for loading and caching titles of different resolutions than the current view, as it is also common for users to zoom in or out of a view.

Once the tiles are loaded in operation 308, flow continues to operation 310 where the loaded hex tiles are decoded into output data. In one example, the decoding operation 310 comprises extracting dataset information from the loaded hex tiles. Alternatively, or additionally, the decoding process may comprise performing additional modifications to the data, such as performing analytics on the hex tile data, coding the hex tile data to indicate which dataset the hex tile is associated with (e.g., decoding data from a first dataset using a first display color and decoding data from a second dataset using a second color so the different datasets can be easily distinguishable when displayed), applying one or more filters to the hex tile data (e.g., filtering for specific age ranges in census data, filtering for specific levels of rainfall, etc.), performing data enrichment, or the like. In examples, the decoding operation 310 may be performed by a server device or a client device in a client server interaction. Alternatively, the decoding operation may be performed by both the client and server device.

In further examples, the decoding process may include performing a data enrichment operations on the hex tile data. For example, various different types of analytics may be performed as part of the decoding process based upon requests received at client device. Examples of enrichment operations may include combining the hex tile data with a local data set on the client device (thereby maintaining data security and privacy), comparing or combining data from different datasets represented by the hex tiles (e.g., joining census data and venue data to determine popularity among venues by age groups, joining rainfall data and population data to determine population trends based up-on rainfall, etc.) One of skill in the art will appreciate that any type of spatially related data can be encoded in a hex tile, thereby allowing flexibility in the type of analytics, computations, and/or data enrichment operations that can be performed using hex tiles.

After the hex tile data has been decoded, flow continues to operation 312 where the decoded data is provided. In one example, providing the decoded data may include rendering, or caused to be rendered, on the client device. In one example, the decoded data may be rendered as an overlay on the current map view. As discussed above, the decoded data may be rendered in a manner that distinguishes data from different datatypes (e.g., using different colors or other indicators), provides an indication of data enrichment or analytic operations performed, or the like. Alternatively, the decoded data may be stored for later use, for example, to be accessed using an API, provided to other applications or processes, or the like.

In one example, the output data may be rendered in a user interface which provides additional functionality for manipulating or viewing the decoded data. For example, the user interface may be operable to receive requests to filter or manipulate the decoded data based upon user requests. In embodiments in which the hex data includes temporal data, the user interface may also be operable to display a change in the decoded data over time. In such examples, the user interface may include a play button which causes an animation of the decoded data showing the changes over time. The user interface may also be operable to allow the user to select a specific point in time to display or control the animation, for example, via a slider provided on the user interface operable to cause playback of the animation of the decoded data forward or backward through time.

Figure 4:
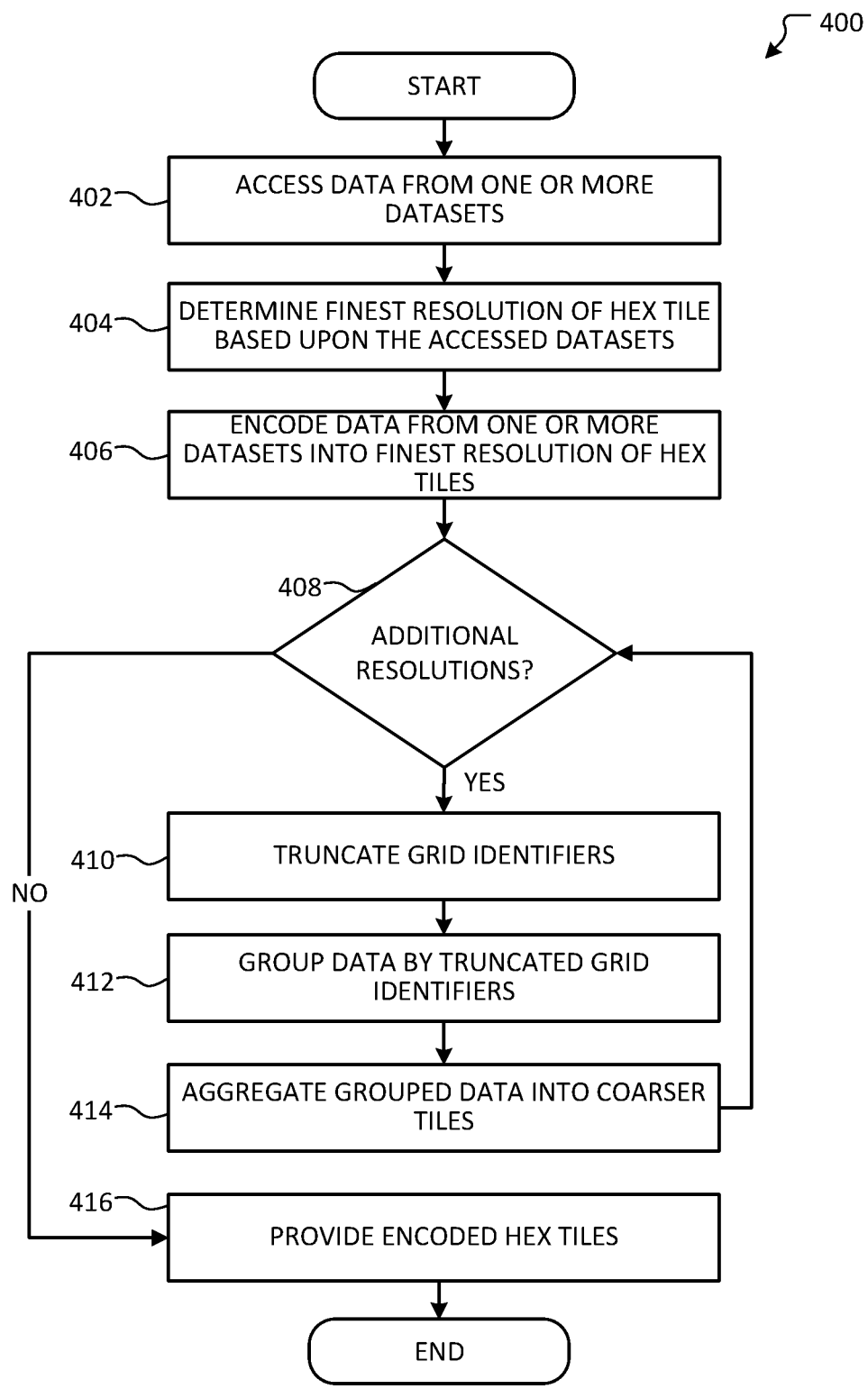
FIG. 4 is a flow diagram illustrating an exemplary method for performing offline encoding of a dataset into hex tiles.

FIG. 4 depicts and exemplary method 400 for encoding a dataset into hex tiles. A general order of the operations for the method 400 is shown in FIG. 4. The method 400 may include more or fewer steps or may arrange the order of the steps differently than those shown in FIG. 4. The method 400 can be executed as a set of computer-executable instructions executed by a cloud system and encoded or stored on a computer readable medium. Further, the method 400 can be performed by gates or circuits associated with a processor, an ASIC, an FPGA, a SOC or other hardware device.

Flow begins at operation 402 where data is accessed from one or more datasets. In one example, the one or more datasets maybe determined based upon a received selection of the one or more datasets, or automatically determined based upon a type of analytics to be performed. Flow continues to operation 404, where the spatial information associated with the dataset is analyzed to determine the finest level of resolution for the dataset. In examples, the finest level is determined by the level of resolution associated with data points in the dataset. For example, a specific latitude/longitude components have a finer resolution than data associated by city, which is has a finer resolution than data associated by state, etc. A level of resolution for a hex tile is determined based upon the level of resolution of the spatial information in the dataset. In examples, all the data in the dataset may be associated with the same level of resolution, however, a dataset may also include different levels of resolution of spatial data without departing from the scope of this disclosure.

Upon determining the finest resolution of spatial information in the dataset, thereby determining the finest level of resolution for a corresponding hex tile, flow continues to operation 404. At operation 406, data from the dataset is encoded into the hex tile. More specifically, the data from the data set is encoded in a hex tile, for example, using the dese or sparse formats previously discussed. One of skill in the art will appreciate, however, that the dataset may be encoded into hex tiles in any type of different formats, so long as a particular portion of data is encoded into a correct hex tile based upon the spatial information associated with the particular portion of data. In doing so, operation 404 projects data from the dataset into a DGGS in a corresponding hex tile based upon the location and resolution defined by spatial information associated the dataset or various different data points in the dataset. In examples, the encoding process may also assign a grid identifier with the encoded data. In examples, the grid identifier may also be associated with the hex tile updated or created at operation 404. As noted above, hex tiles may exist as part of or can be used to construct a hierarchical grid of hex tiles, where each level in the hierarchy represents a different resolution (e.g., a different zoom level in a map view). In examples, the grid identifier may also represent the hierarchal relationship of the of the hex tiles, such that a first portion of the identifier may be equated with the coarsest level of the hierarchy, the next portion with the next coarsest level, and so on until the finest level of resolution in the hex tile hierarchy is reached.

Flow continues to operation 408 where a determination is made as to whether the additional hex tiles having different resolutions exist and/or can be created. After initially encoding data from the dataset into a hex tile representing the finest level of resolution based upon the spatial data in the dataset, a determination is made as to whether the data should be encoded into hex tiles having a coarser resolution. If so, flow branches YES from operation 408 to operation 410. At operation 410, the grid identifiers associated with the hex tiles is truncated. As noted above, the grid identifier represents an individual hex tile relative to other hex tiles in a hex tile hierarchy. For example, as noted above, each hex tile can be subdivided into seven sub tiles. The grid identifier for each sub tile also includes an identifier for the sub tile's parent hex tile. As such, a hex tile's parent tile can be identified by truncating the grid identifier for the hex tile to reproduce the grid identifier for the parent hex tile. At operation 410, the parent hex tiles for the hex tiles in which data was encoded at operation 406 are identified by truncating the grid identifier for each of the hex tiles.

Upon identifying the parent tiles, flow continues to operation 412, where the data encoded at operation 412 is grouped. In examples, encoded data is grouped together based upon a comparison of the truncated grid identifiers produced at operation 410. Data with matching truncated identifiers is grouped together and, continuing to operation 414, aggregated and encoded into the parent hex tile (e.g., a hex tile with a coarser resolution). One of skill in the art will appreciate that any process for aggregating data may be performed at operation 414. Further, additional metadata may be generated at operation 414 and stored with the parent hex tile. Such metadata may include, but is not limited to, information about the resolution of the parent hex tile, the identifier for the parent hex tile (e.g., generated by truncating the child hex tile identifiers), and the like. In certain embodiment, aggregation may not be required. For example, an offload encoder can be implemented without aggregating the tile data. Rather, aggregation during the offline encoding process may be used to encode individual points of data into hex tiles, but may not be required. As such, operation 414 may be an optional step. After the data is aggregated, or optionally skipped, and encoded into the parent hex tile at operation 414, flow returns to operation 408 where it is again determined whether the data should be aggregated into a hex tile having an even coarser resolution. In one example, when grouping a next level of tiles, the grouping may be based upon the parent level or, alternatively, the next level of tiles may still generate a group based upon the finest resolution set of tiles encoded at operation 406. In such embodiments, the identifiers for the finest level of tiles may be truncated two or more times in order to determine an identifier for the next level of tiles (depending upon the level of resolution for the next level of tiles). This process will continue until the coarsest resolution of hex tile is reached, at which point flow branches NO from operation 408 to operation 416.

At operation 416, the encoded hex tiles are provided. In one example, providing the encoded hex tiles may include sending the encoded hex tiles to a client device. In an alternate example, providing the hex tiles may include storing the hex tiles in a hex tile catalog which can be accessed at a later time. In still further embodiments, the provided hex tiles may be continually updated with new encoded information. As previously discussed, one or more datasets may include temporal data which is updated regularly. When such datasets are encoded as hex tiles, previously encoded hex tiles may be updated to include new temporal information as their underlying datasets are updated. Alternatively, or additionally, the new hex tiles may be created when new temporal data is received.

Figure 5:
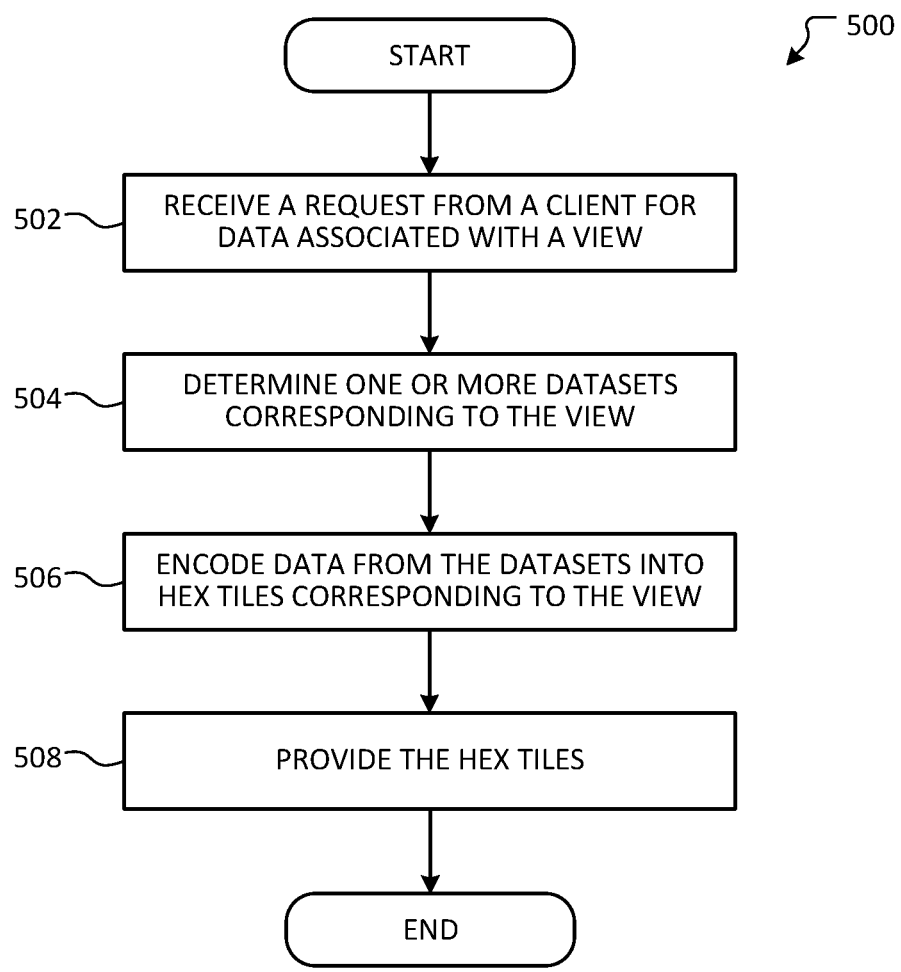
FIG. 5 is a flow diagram illustrating an exemplary method for performing online encoding of a dataset into hex tiles.

FIG. 5 is a flow diagram illustrating an exemplary method 500 for performing online encoding of a dataset into hex tiles. A general order of the operations for the method 500 is shown in FIG. 5. The method 500 may include more or fewer steps or may arrange the order of the steps differently than those shown in FIG. 5. The method 500 can be executed as a set of computer-executable instructions executed by a cloud system and encoded or stored on a computer readable medium. Further, the method 500 can be performed by gates or circuits associated with a processor, an ASIC, an FPGA, a SOC or other hardware device.

As previously discussed, aspects disclosed here provide for sending portions of a global data set to a client device on demand in a way that it appears to the client as if the entire global data set has been provided. This is accomplished by determining specific data related to a current view of a map displayed on a client and delivering data encoded in hex tiles related to the view. One process for doing so is depicted in the offline encoding method 500 depicted in FIG. 5. Flow begins at operation 502 where a request for data associated with a view is received from the client device. In one aspect, the request is associated with a current view of a map displayed on the client. As discussed above, a view may encompass the current location being displayed, the current zoom level, or resolution, of the map, and/or one or more associated datasets. As discussed the datasets may be determined based upon an affirmative selection of the datasets provided by the client device, or may be determined based upon analytic or enrichment operations requested by the client device or to be performed by the client device itself.

Upon receiving a request with the view information, flow continues to operation 504 where one or more datasets corresponding to the view is determined. The determination may be based upon an analysis of the spatial information in one or more datasets to identify data related to the location and resolution of the view associated with the request. For example, location and resolution information associated with the view can be used to query one or more datasets to identify datasets with spatial information that corresponds to the view's location and resolution. Alternatively, the location and information data may be used to identify existing hex tiles that correspond to the view, for example, from a hex tile catalog.

Flow continues to operation 506 where, upon identifying data corresponding to the view, the identified data is encoded into hex tiles. In examples, encoding the data into the hex tiles may be perform as described with respect to FIG. 4. Alternatively, or additionally, rather than encoding data at operation 506, previously encoded hex tiles corresponding to the view may be retrieved at operation 506. Once the identified data is encoded in the hex tiles and/or related hex tiles are retrieved from the hex tile catalog, the hex tiles are provided to the client at operation 508. In one example, the hex tiles may be sent to the client via a network at operation 508.

Figure 6:
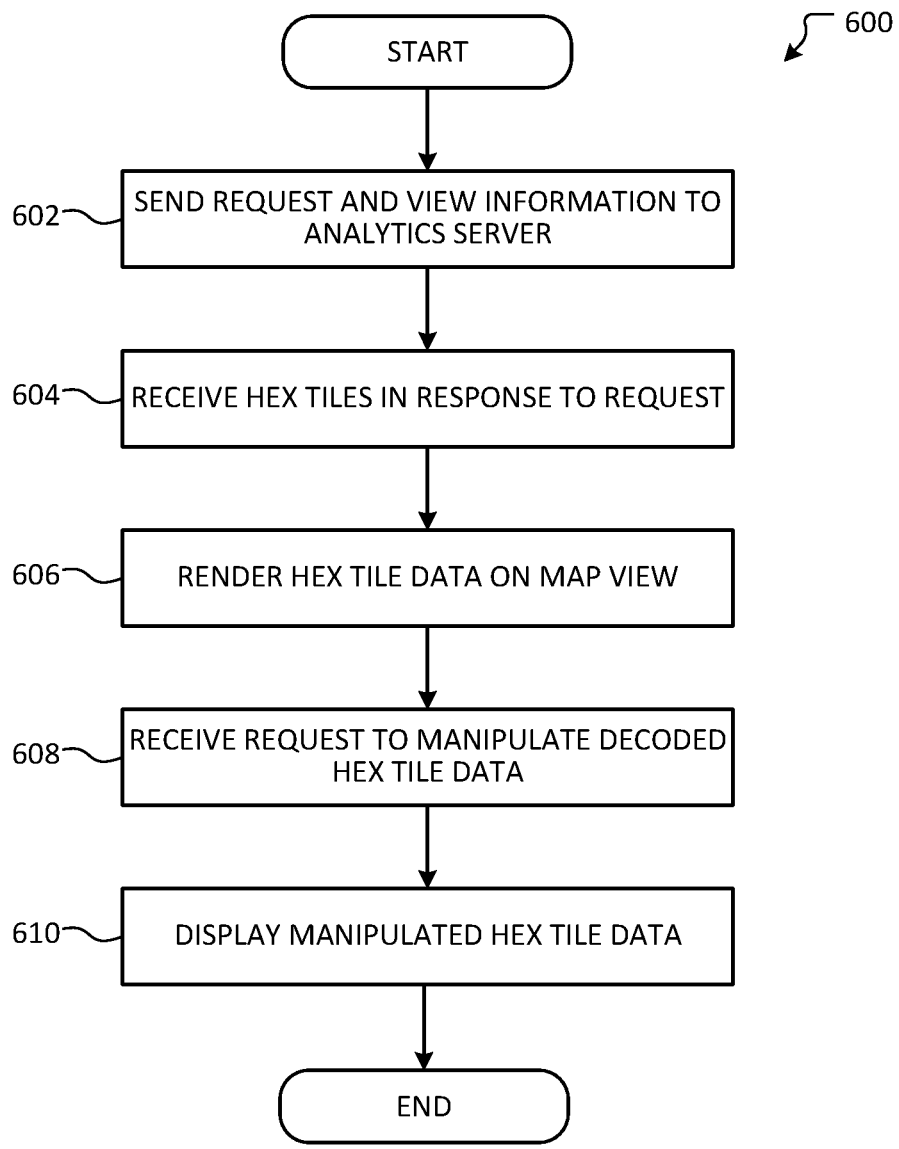
FIG. 6 is a flow diagram illustrating an exemplary method for displaying hex tile data received from an analytics server.

FIG. 6 is a flow diagram illustrating an exemplary method 600 for displaying hex tile data received from an analytics server. A general order of the operations for the method 500 is shown in FIG. 5. The method 500 may include more or fewer steps or may arrange the order of the steps differently than those shown in FIG. 5. The method 500 can be executed as a set of computer-executable instructions executed by a cloud system and encoded or stored on a computer readable medium. Further, the method 500 can be performed by gates or circuits associated with a processor, an ASIC, an FPGA, a SOC or other hardware device.

Flow begins at operation 602 where a request is sent to an analytics server. In one example, the request may be automatically generated based upon a current map view displayed on the device performing the method 600. For example, upon receiving a manipulation of a map view, such as, for example, zooming in or out on the map, changing the location shown in the map, or the like. In response to receiving the manipulation, a request to for hex tile data associated with the new view may be automatically generated and sent to the analytics server. The request may include view information, such as location, zoom level, and/or resolution, and/or dataset information, such as data identifying a specific dataset. In response to sending the request, flow continues to operation 604 where hex tiles are received from the global analytics server.

Flow continues to operation 606 where the hex tile data is decoded rendered on the map view. As previously discussed, the decoded data may be rendered as an overlay on the current map view. As discussed above, the decoded data may be rendered in a manner that distinguishes data from different datatypes (e.g., using different colors or other indicators), provides an indication of data enrichment or analytic operations performed, or the like.

In one example, the output data may be rendered in a user interface which provides additional functionality for manipulating or viewing the decoded data. At operation 608, a request to manipulate the decoded hex tile data is received via the user interface. For example, the user interface may be operable to receive requests to filter or manipulate the decoded data based upon user requests. In embodiments in which the hex data includes temporal data, the user interface may also be operable to display a change in the decoded data over time. In such examples, the user interface may include a play button which causes an animation of the decoded data showing the changes over time. The user interface may also be operable to allow the user to select a specific point in time to display or control the animation, for example, via a slider provided on the user interface operable to cause playback of the animation of the decoded data forward or backward through time.

Upon receiving the request to manipulate the decoded hex tile data, the manipulations are performed and the manipulated data is rendered and displayed at operation 610. Although not shown, the method 600 may be performed each time the view is changed. For example, when the user zooms in or out or changes the location of the map, a new request may be generated and corresponding hex tile data may be received and rendered in response. As the request corresponds to the current view displayed to the user, in examples, only hex tiles related to the review (and, potentially, some adjacent hex tiles for caching) may be received in response to the request, thereby reducing the amount of data that need to be exchanged between the analytics server and the client device. In doing so, the data can be delivered in a manner in which it appears to the user that the entire global dataset resides on the client device without requiring a transfer of a large amount of data. Alternatively, rather than rendering and displaying the data at operation 610, the data may be stored, further processed, or provided to another application or process at operation 610.

Figure 7:
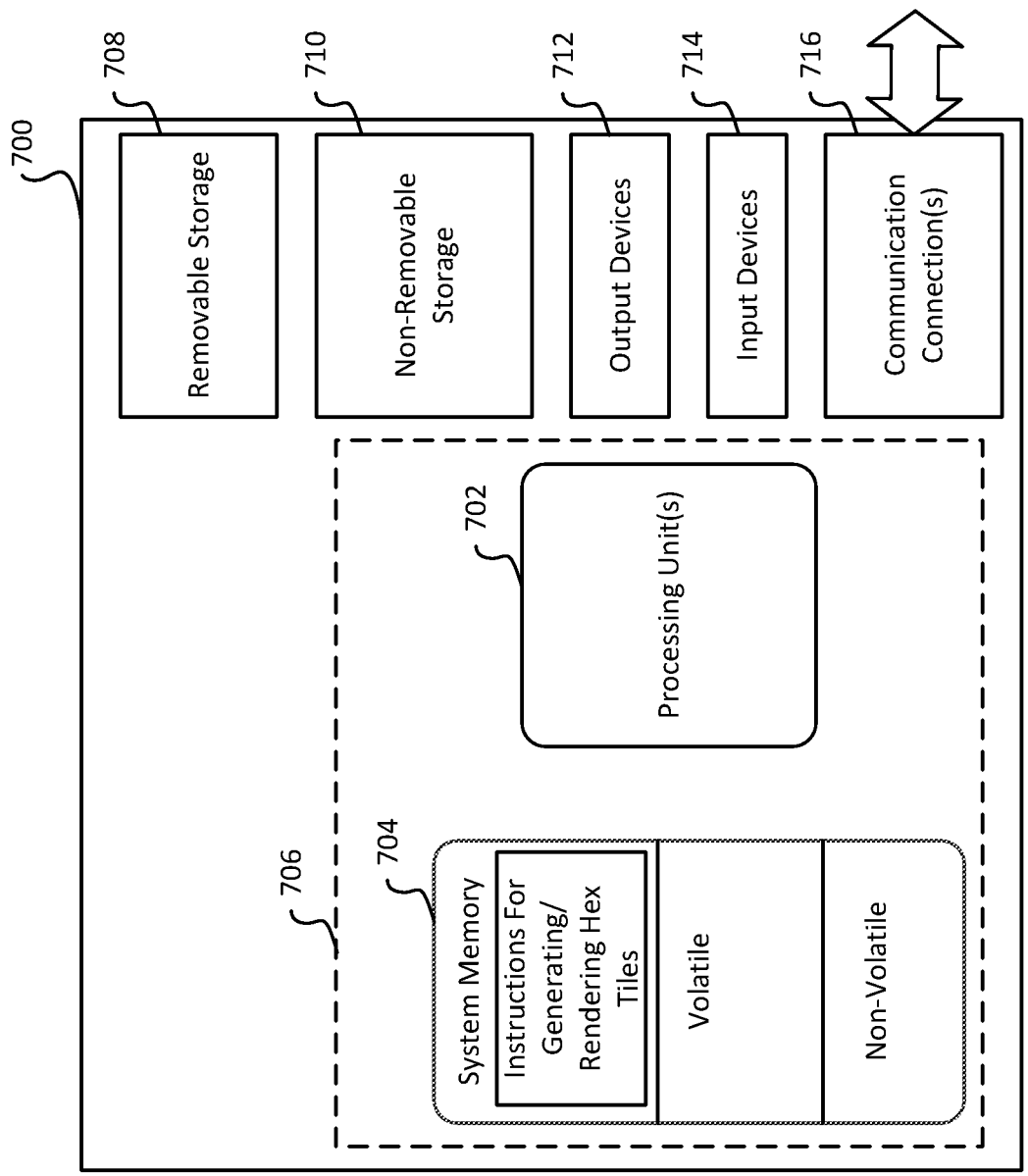
FIG. 7 illustrates a simplified block diagram of a device with which aspects of the present disclosure may be practiced in accordance with aspects of the present disclosure.

FIG. 7 illustrates a simplified block diagram of a device with which aspects of the present disclosure may be practiced in accordance with aspects of the present disclosure. The device may be a mobile computing device, for example. One or more of the present embodiments may be implemented in an operating environment 700. This is only one example of a suitable operating environment and is not intended to suggest any limitation as to the scope of use or functionality. Other well-known computing systems, environments, and/or configurations that may be suitable for use include, but are not limited to, personal computers, server computers, hand-held or laptop devices, multiprocessor systems, microprocessor-based systems, programmable consumer electronics such as smartphones, network PCs, minicomputers, mainframe computers, distributed computing environments that include any of the above systems or devices, and the like.

In its most basic configuration, the operating environment 700 typically includes at least one processing unit 702 and memory 704. Depending on the exact configuration and type of computing device, memory 704 (instructions to perform generating and/or manipulating hex tiles as described herein) may be volatile (such as RAM), non-volatile (such as ROM, flash memory, etc.), or some combination of the two. This most basic configuration is illustrated in FIG. 7 by dashed line 706. Further, the operating environment 700 may also include storage devices (removable, 708, and/or non-removable, 710) including, but not limited to, magnetic or optical disks or tape. Similarly, the operating environment 700 may also have input device(s) 714 such as remote controller, keyboard, mouse, pen, voice input, on-board sensors, etc. and/or output device(s) 712 such as a display, speakers, printer, motors, etc. Also included in the environment may be one or more communication connections 716, such as LAN, WAN, a near-field communications network, a cellular broadband network, point to point, etc.

Operating environment 700 typically includes at least some form of computer readable media. Computer readable media can be any available media that can be accessed by processing unit 702 or other devices comprising the operating environment. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, non-transitory medium which can be used to store the desired information. Computer storage media does not include communication media. Computer storage media does not include a carrier wave or other propagated or modulated data signal.

Communication media embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

The operating environment 700 may be a single computer operating in a networked environment using logical connections to one or more remote computers. The remote computer may be a personal computer, a server, a router, a network PC, a peer device or other common network node, and typically includes many or all of the elements described above as well as others not so mentioned. The logical connections may include any method supported by available communications media. Such networking environments are commonplace in offices, enterprise-wide computer networks, intranets and the Internet.

Aspects disclosed herein generally relate to systems and methods for providing a platform for performing geospatial analysis, unification, and visualization of datasets has been described. In the above description, for purposes of explanation, numerous specific details are set forth in order to provide a thorough understanding of the techniques introduced above. It will be apparent, however, to one skilled in the art that the techniques can be practiced without these specific details. In other instances, structures and devices are shown in block diagram form in order to avoid obscuring the description and for ease of understanding. For example, the techniques are described in one embodiment above primarily with reference to software and particular hardware. However, the present invention applies to any type of computing system that can receive data and commands, and present information as part of any peripheral devices providing services.

Reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Some portions of the detailed descriptions described above are presented in terms of algorithms and symbolic representations of operations on data bits within a computer memory. These algorithmic descriptions and representations are, in some circumstances, used by those skilled in the data processing arts to convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing", "computing", "calculating", "determining", "displaying", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The techniques also relate to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer readable storage medium, such as, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

Some embodiments can take the form of an entirely hardware embodiment, an entirely software embodiment or an embodiment containing both hardware and software elements. One embodiment is implemented in software, which includes but is not limited to firmware, resident software, microcode, etc.

Furthermore, some embodiments can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code can include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description above. In addition, the techniques are not described with reference to any particular programming language. It will be appreciated that a variety of programming languages may be used to implement the teachings of the various embodiments as described herein.

The foregoing description of the embodiments has been presented for the purposes of illustration and description. It is not intended to be exhaustive or to limit the specification to the precise form disclosed. Many modifications and variations are possible in light of the above teaching. It is intended that the scope of the embodiments be limited not by this detailed description, but rather by the claims of this application. As will be understood by those familiar with the art, the examples may be embodied in other specific forms without departing from the spirit or essential characteristics thereof. Likewise, the particular naming and division of the modules, routines, features, attributes, methodologies and other aspects are not mandatory or significant, and the mechanisms that implement the description or its features may have different names, divisions and/or formats. Furthermore, as will be apparent to one of ordinary skill in the relevant art, the modules, routines, features, attributes, methodologies and other aspects of the specification can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the specification is in no way limited to embodiment in any specific programming language, or for any specific operating system or environment. Accordingly, the disclosure is intended to be illustrative, but not limiting, of the scope of the specification, which is set forth in the following claims.

What is claimed is:

1. A method comprising:
   accessing data from one or more datasets;
   determining, based upon spatial information associated with the one or more datasets, a first resolution level for a tile, wherein the first resolution level is based upon an altitude of a map view;
   encoding the data from the one or more data sets into a first set tiles, wherein the one or more tiles are associated with the first resolution level;
   determining whether to generate a second set of tiles, wherein the second set of tiles is associated with a second resolution, wherein the second resolution is different from the first resolution; and
   when it is determined to generate the second set of tiles:
      grouping data from at least a first tile and a second tile from the first set of tile data;
      aggregating the data from the first tile and the second tile; and
      encoding the aggregated data in at least a third tile, wherein the second set of tiles comprises the third tile.

2. The method of claim 1, wherein encoding the data into the first set of tiles comprises generating tile identifiers for the tiles included in the first set of tiles.

3. The method of claim 1, wherein grouping data from at least the first tile and second tile comprises:
   truncating a first tile identifier for the first tile to generate a first truncated identifier;
   truncating a second tile identifier for the second tile to generate a second truncated identifier;
   comparing the first truncated identifier and second truncated identifier; and
   when the first truncated identifier and second truncated identifier are the same, grouping data from the first tile and the second tile.

4. The method of claim 3, wherein the third tile is associated with a third tile identifier, and wherein the third tile identifier is the same as the first truncated identifier and the second truncated identifier.

5. The method of claim 1, wherein the first resolution level is based upon a finest level of resolution included in the spatial information.

6. The method of claim 5, wherein the second resolution level is a coarser resolution level and the first resolution level.

7. The method of claim 6, further comprising:
   determining whether to generate a third set of tiles, wherein the third set of tiles is associated with a third resolution; and
   when it is determined to generate the third set of tiles:
      grouping data from at least a fourth tile and a fifth tile from the second set of tile data;
      aggregating the data from the fourth tile and the fifth tile; and
      encoding the aggregated data in at least a sixth tile, wherein the third set of tiles comprises the sixth tile.

8. A method comprising:
   accessing one or more datasets;
   encoding data from the one or more datasets into a set of hex tiles;
   determining a map view;
   based upon the map view, loading a subset of hex tiles from the set of hex tiles, wherein the subset of hex tiles corresponds to the map view, wherein loading the subset of hex tiles comprises identifying the subset of hex tiles that corresponds to the map view and a resolution of the map view based upon an altitude of the map view and caching at least a second set of hex tiles that correspond to a different resolution of the current view;
   decoding the subset of hex tiles; and
   rendering the subset of hex tiles.

9. The method of claim 8, wherein the subset of hexagonal tiles represents a portion of a discrete global grid system corresponding to the map view.

10. The method of claim 8, wherein decoding the subset of hex tiles comprises at least one of:
    adding grid identifiers to dense tiles in the subset of hex tiles; or
    translating between incompatible data formats of the one or more datasets.

11. The method of claim 8, wherein the subset of hex tiles comprises temporal data encoded in the subset of hex files.

12. The method of claim 11, wherein rendering the subset of hex tiles comprises generating an animation overlaid on the map view, the animation depicting a change in hex tile data based upon the temporal data encoded in the subset of hex files.

13. The method of claim 8, wherein rendering the hex tiles comprises causing decoded data from the decoded subset of hex tiles to be overlaid on the map view.

14. A system comprising:
    at least one processor; and
    memory encoding computer executable instruction that, when executed by the at least one processor, perform a method comprising:
       accessing data from one or more datasets;
       determining, based upon spatial information associated with the one or more datasets, a first resolution level for a hex tile, wherein the first resolution level is based upon an altitude of a map view;
       encoding the data from the one or more data sets into a first set hex tiles, wherein the one or more hex tiles are associated with the first resolution level;
       determining whether to generate a second set of hex tiles, wherein the second set of hex tiles is associated with a second resolution, wherein the second resolution is different from the first resolution; and
       when it is determined to generate the second set of hex tiles:
          grouping data from at least a first hex tile and a second hex tile from the first set of hex tile data;
          aggregating the data from the first hex tile and the second hex tile; and encoding the aggregated data in at least a third hex tile, wherein the second set of hex tiles comprises the third hex tile.

15. The system of claim 14, wherein encoding the data into the first set of hex tiles comprises generating hex tile identifiers for the hex tiles included in the first set of hex tiles.

16. The system of claim 14, wherein grouping data from at least the first hex tile and second hex tile comprises:
   truncating a first hex tile identifier for the first hex tile to generate a first truncated identifier;
   truncating a second hex tile identifier for the second hex tile to generate a second truncated identifier;
   comparing the first truncated identifier and second truncated identifier; and
   when the first truncated identifier and second truncated identifier are the same, grouping data from the first hex tile and the second hex tile.

17. The system of claim 16, wherein the third hex tile is associated with a third hex tile identifier, and wherein the third hex tile identifier is the same as the first truncated identifier and the second truncated identifier.

18. The system of claim 14, wherein the first resolution level is based upon a finest level of resolution included in the spatial information.

19. The system of claim 18, wherein the second resolution level is a coarser resolution level and the first resolution level.

20. The system of claim 19, wherein the method further comprises:
   determining whether to generate a third set of hex tiles, wherein the third set of hex tiles is associated with a third resolution; and
   when it is determined to generate the third set of hex tiles:
      grouping data from at least a fourth hex tile and a fifth hex tile from the second set of hex tile data;
      aggregating the data from the fourth hex tile and the fifth hex tile; and
      encoding the aggregated data in at least a sixth hex tile, wherein the third set of hex tiles comprises the sixth hex tile.

* * * * *